US008848735B2

(12) United States Patent
Yang

(10) Patent No.: US 8,848,735 B2
(45) Date of Patent: Sep. 30, 2014

(54) METHOD AND DEVICE FOR MIMO TRANSMISSION IN HIGH SPEED PACKET ACCESS EVOLUTION SYSTEM

(75) Inventor: Yu Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 299 days.

(21) Appl. No.: 13/062,149

(22) PCT Filed: Sep. 4, 2009

(86) PCT No.: PCT/CN2009/001003
§ 371 (c)(1),
(2), (4) Date: May 5, 2011

(87) PCT Pub. No.: WO2010/034182
PCT Pub. Date: Apr. 1, 2010

(65) Prior Publication Data
US 2011/0261833 A1   Oct. 27, 2011

(30) Foreign Application Priority Data

Sep. 4, 2008 (CN) .......................... 2008 1 0119363

(51) Int. Cl.
| H04L 12/28 | (2006.01) |
| H04L 5/00 | (2006.01) |
| H04L 1/16 | (2006.01) |
| H04L 1/00 | (2006.01) |
| H04W 28/04 | (2009.01) |
| H04W 72/04 | (2009.01) |

(52) U.S. Cl.
CPC ............ *H04L 5/0053* (2013.01); *H04L 1/1671* (2013.01); *H04W 28/04* (2013.01); *H04L 1/0072* (2013.01); *H04W 72/0466* (2013.01)
USPC .......................................... 370/465; 710/316

(58) Field of Classification Search
CPC .................................................... H04W 28/16
USPC ........... 370/465, 260, 329, 351, 315; 375/260
See application file for complete search history.

(56) References Cited

U.S. PATENT DOCUMENTS

| 2008/0117873 A1* | 5/2008 | Ranta-Aho et al. ........... 370/329 |
| 2008/0144561 A1* | 6/2008 | Kaikkonen et al. ........... 370/315 |
| 2008/0205348 A1 | 8/2008 | Malladi |
| 2008/0212608 A1* | 9/2008 | Haikola et al. ................ 370/465 |
| 2009/0028129 A1* | 1/2009 | Pi et al. .......................... 370/351 |
| 2009/0034461 A1* | 2/2009 | Pelletier et al. ............... 370/329 |
| 2009/0213944 A1* | 8/2009 | Grant ............................ 375/260 |
| 2010/0322332 A1* | 12/2010 | Zheng ........................... 375/260 |

FOREIGN PATENT DOCUMENTS

| CN | 1741680 | 3/2006 |
| CN | 101039512 | 9/2007 |

* cited by examiner

Primary Examiner — Wei Zhao
Assistant Examiner — Lionel Preval
(74) Attorney, Agent, or Firm — Fay Kaplun & Marcin, LLP

(57) ABSTRACT

A method and device for MIMO transmission in high speed packet access evolution system, the method includes: determining each signaling in high speed shared information channel HS-SICH; duplexing all signaling as HS-SICH signaling; carrying channel coding for HS-SICH signaling, and mapping to the allocated channelization code resource.

7 Claims, 5 Drawing Sheets

METHOD AND DEVICE FOR MIMO TRANSMISSION IN HIGH SPEED PACKET ACCESS EVOLUTION SYSTEM

CROSS REFERENCE TO RELATED APPLICATIONS

The present application is a US National Stage of International Application No. PCT/CN2009/001003, filed 4 Sep. 2009, designating the United States, and claiming priority to Chinese Patent Application No. 200810119363.1 filed 4 Sep. 2008.

FIELD OF THE INVENTION

The present invention relates to the field of mobile communications and particularly to a method and device for MIMO transmission in a high speed packet access evolution system.

BACKGROUND OF THE INVENTION

The High Speed Packet Access (HSPA) proposed to support a higher-rate data service, a shorter delay, a higher throughput and spectrum utilization ratio and better coverage of services at a high data rate includes the High Speed Downlink Packet Access (HSDPA) and the High Speed Uplink Packet Access (HSUPA). Particularly, the HSDPA relates to an enhanced and evolved radio part in the standard of Time Division-Synchronous Code Division Multiple Access (TD-SCDMA) to significantly improve a transmission rate of downlink data. A High-Speed Shared Information Channel (HS-SICH) is added in Time Division Duplexing (TDD) HSDPA as an uplink control physical channel responsible for bearing Acknowledgement/Negative Acknowledgement (ACK/NACK) information to a Hybrid-Automatic Repeat reQuest (HARQ) for data over a High Speed Downlink Shared Channel (HS-DSCH) and Channel Quality Indicator (CQI) information and also carrying Transmission Power Control (TPC) and Synchronization Shift (SS) information. However, there is no Transport Format Combination Indicator (TFCI) carried in the HS-SICH. An HS-SICH channel occupies one channelization code with an uplink Spread Factor (SF) of 16, and the timeslot of #5 is usually occupied. The HS-SICH is a shared physical channel so that the same spread code is used for multiple users who are distinguished from one another by an orthogonal sequence. Signaling over the HS-SICH is as shown in Table 1 below.

TABLE 1

| HARQ ACK/NACK information | 1 bit | 1-ACK and 0-NACK |
|---|---|---|
| RTBS | 6 bits | UE Recommended Transport Block Size |
| RMF | 1 bit | UE Recommended Modulation Format: 0-QPSK and 1-16QAM |
| SS | Downlink synchronization control word | |
| TPC | Downlink power control word | |

For downlink data to be transmitted, a Node B firstly transmits downlink scheduling and control information over an HS-SCCH to indicate to a UE the presence of HSDPA data over a subsequent High-Speed Physical Downlink Shared Channel (HS-PDSCH), and the UE retrieves a transport block by unscrambling the HS-SCCH and then feeds ACK/NACK information and channel quality indicator information, i.e., a Recommended Transport Block Size (RTBS) and a Recommended Modulation Format (RMF), to the Node B over a corresponding HS-SICH.

The HSPA+ is an evolved version of the HSPA with enhanced uplink and downlink capabilities. The Multiple Input Multiple Output (MIMO) is introduced in the HSPA+ to further improve a data transmission rate and a capacity of the system. In view of issues of implementing a UE in hardware, a consumption cost thereof, etc., downlink transmission of dual streams at most is supported in the MIMO solution in the HSPA+.

For MIMO transmission of dual streams in the TDD HSPA+ system, a branch of high speed data stream is divided into two parallel branches of data streams at a lower rate, which are in turn encoded, interleaved, modulated, etc. Since different encoding rates and symbol mapping schemes may be used for the two branches of data streams, the number of information bits assigned over the respective streams may also vary. Each of the data streams is further divided into a number C of sub-streams (C is the largest number of HS-PDSCHs defined according to the capability of a UE), each of which is further spread and scrambled and then transmitted over multiple antennas.

In order to support MIMO transmission of dual streams, it is necessary to, feed back the acknowledgement of the UE for the data of the dual streams and to recommend to the Node B the number of data streams in the next Transmission Time Interval (TTI) and transport block sizes and modulation formats over the respective data streams, over the HS-SICH. Apparently, this can not be performed over the existing HSDPA HS-SICH.

SUMMARY OF THE INVENTION

In view of this, embodiments of the invention provide a method and device for MIMO transmission in a high speed packet access evolution system to thereby implement an MIMO-enabled TDD HSPA+ system and improve a data transmission rate and the throughput of the system.

In order to address the foregoing problem, technical solutions according to the embodiments of the invention are as follows.

A method for MIMO transmission in a high speed packet access evolution system includes:

determining signaling over a High Speed Shared Information Channel, HS-SICH;

multiplexing all of the signaling into HS-SICH signaling; and performing channel encoding on the HS-SICH signaling and mapping encoded signaling onto an allocated channelization code resource.

A method for MIMO transmission in a high speed packet access evolution system includes:

determining signaling over a High Speed Shared Information Channel, HS-SICH, and determining, according to the number of data streams over a downlink service channel, a channelization code resource over which the HS-SICH is borne;

encoding all of the signaling over the HS-SICH respectively; and multiplexing and mapping all of encoded signaling onto determined channelization code resource over which the HS-SICH is borne.

A user equipment includes:

a signaling determination unit configured to determine signaling over a High Speed Shared Information Channel, HS-SICH;

a multiplexing unit connected with the signaling determination unit and configured to multiplex all of the signaling into HS-SICH signaling;

an encoding unit connected with the multiplexing unit and configured to perform channel encoding on the HS-SICH signaling;

an interleaving unit connected with the encoding unit and configured to output a read sequence resulting from the multiplexing and the encoding in a specific sequence according to a specified interleave pattern; and a mapping unit connected with the interleaving unit and configured to map the output of the interleaving unit onto an allocated channelization code resource.

A user equipment includes:

a determination unit configured to determine signaling over a High Speed Shared Information Channel, HS-SICH, and to determine, according to the number of data streams over a downlink service channel, a channelization code resource over which the HS-SICH is borne;

an encoding unit connected with the determination unit and configured to encode all of the signaling over the HS-SICH respectively;

a multiplexing unit connected with the encoding unit and configured to multiplex all of encoded signaling;

an interleaving unit connected with the multiplexing unit and configured to output a read sequence resulting from the encoding and the multiplexing in a specific sequence according to a specified interleave pattern;

a mapping unit connected with the interleaving unit and configured to map an output from the interleaving unit onto a determined channelization code resource over which the HS-SICH is borne.

As can be apparent from the foregoing technical solutions according to the embodiments of the invention, the HS-SICH channel architecture in the existing HSDPA is augmented and modified in the TDD HSPA+ system according to the embodiments of the invention so that the MIMO HS-SICH is borne over an increased channelization code resource in the new encoding scheme other than being limited to one channelization code with an SF of 16 in the specification of the prior art, thus achieving a better support of downlink MIMO transmission in the HSPA+ and hence improving a data transmission rate and the throughput of the system.

DETAILED DESCRIPTION OF THE EMBODIMENTS

Figure 1:
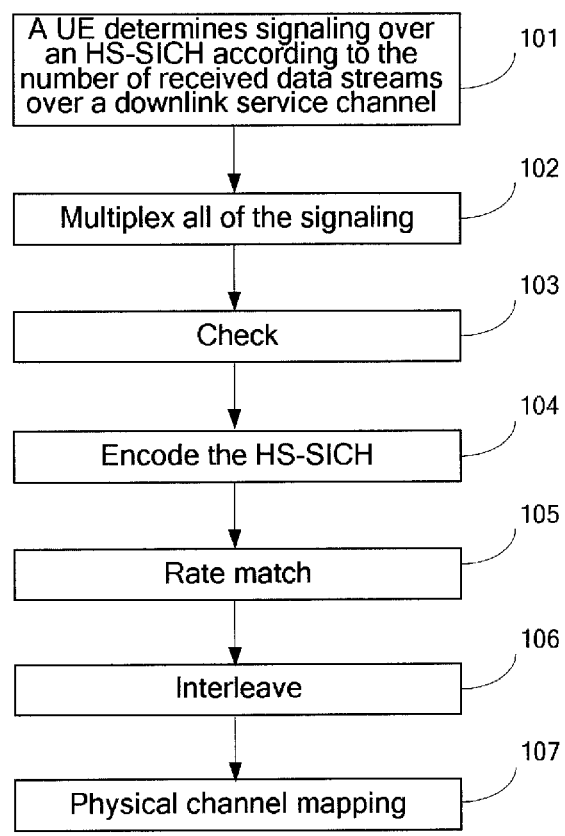
FIG. 1 illustrates a flow chart of a method for MIMO transmission in an HSPA+ system according a first method embodiment of the invention.

The method according to an embodiment of the invention will be described in details hereinafter with reference to the drawings and embodiments thereof to facilitate better understanding of the embodiments of the invention by those skilled in the art.

In order to implement a TDD HSPA+ system supporting MIMO transmission of dual streams in the embodiments of the invention, control signaling over an HS-SICH is augmented and modified to thereby, feed back the acknowledgement of a UE for received data of the dual streams and recommend to a Node B the number of data streams in the next TTI and transport block sizes and modulation formats over the respective data streams, over the HS-SICH channel, so that a better support of MIMO can be achieved in the HSPA+ system, thus improving a data transmission rate and a throughput of the system.

As opposed to a single stream of MIMO, control signaling over an HS-SICH has to be augmented for dual streams of MIMO and inevitably lengthened as a consequence, and the performance of reception over the HS-SICH channel would be deteriorated if the channel were still borne over one channelization code with an SF of 16. Therefore in the embodiments of the invention, an increased channelization code resource over which the HS-SICH is borne is provided to ensure proper reception of the signaling over the channel.

In the method for MIMO transmission in an HSPA+ system according to an embodiment of the invention, signaling information over an HS-SICH are firstly multiplexed together and then encoded and borne over a channelization code resource which is richer than that in the existing standard, e.g., a channelization code with an SF of 8 or even with an lower SF.

Furthermore in the method for MIMO transmission in an HSPA+ system according to another embodiment of the invention, an encoding scheme for the HS-SICH similar to that in the existing specification may be used, that is, encoding signaling information over the HS-SICH respectively and then multiplexing encoded result, and a corresponding channelization code resource is selected adaptively as a bearer after interleaving.

In the embodiments of the invention, there are two scenarios of a single stream and dual streams of MIMO. Since MIMO transmission of data is not always performed in dual streams because the data has to be switched to transmission in a single stream so as to guarantee a transmission quality thereof under a poor channel condition and then can be switched to transmission in dual streams when the channel condition becomes good. Therefore in the embodiments of the invention, both a single stream and dual streams can be supported by the signaling information involved over the HS-SICH.

Since whether the system operates in a non-MIMO mode or an MIMO mode may be configured by upper layer signaling of Radio Resource Control (RRC), that is, which of the operation modes is active for a specific period of time is decided at an upper layer according to factors of a real-time service type, amount of user data, channel environment, etc. The non-MIMO mode refers to an operation mode in which no MIMO is introduced in the HSDPA, and the MIMO mode refers to an operation mode in which the MIMO is introduced in a TDD HSPA+ system. Therefore, whether signaling information over an HS-SICH is in a non-MIMO mode or an MIMO mode may be determined from the current operation mode of the system. It is sufficient in a non-MIMO mode to adopt the same signaling design and channel encoding scheme as in the specification of the prior art. Only a signaling design and a channel encoding scheme in an MIMO mode in the embodiments of the invention will be described in details hereinafter.

Reference is made to FIG. 1 illustrating a flow chart of a method for MIMO transmission in an HSPA+ system according to a first method embodiment of the invention, which generally includes the following operations 101-107.

In the operation 101, a UE determines signaling over an HS-SICH according to the number of received data streams over a downlink service channel, where if the number of received data streams over the downlink service channel relates to a single stream, then signaling of the single stream is borne over the HS-SICH; or if the number of received data streams relates to dual streams, then signaling of the dual streams is borne over the HS-SICH;

In the operation 102, all of the signaling, i.e., signaling of ACK, RMF, RTBS, etc., over the HS-SICH is multiplexed;

It shall be noted that the total length of signaling over the HS-SICH varies with a varying number of data streams because signaling information required for a single stream and dual streams is different in length;

In the operation 103, a check is performed on multiplexed signaling;

A check may be performed with a Cyclic Redundancy Code (CRC) to facilitate counting of block errors and to assist outer loop power control. Alternatively, a UE-specific CRC may be calculated (i.e. XORing the CRC check value and the identifier of the UE) and attached;

In the operation 104, the checked signaling over the HS-SICH is encoded, for example, with a convolution code;

In the operation 105, rate matching is performed on encoded signaling;

If the length of a sequence resulting from the encoding of the channel is larger than the length of bits that can be borne over an allocated channelization code resource, then some bits of the sequence may be deleted appropriately; otherwise, no bit will be deleted;

In the operation 106, interleaving is performed on the signaling after rate matching; and In the operation 107, physical channel mapping is performed to map the interleaved signaling over the HS-SICH onto the allocated channelization code resource, e.g., a channelization code with an SF of 8 or even with a lower SF.

In this present embodiment, signaling information over the HS-SICH are firstly multiplexed together and then encoded and borne over a channelization code resource which is richer than that in the existing standard, so that the acknowledgement of the UE for received data of dual streams can be fed back and the number of data streams in the next TTI and transport block sizes and modulation formats over the respective data streams can be recommended to a Node B over the HS-SICH.

Correspondingly, there are the following two scenarios of different rate matching modes upon reception at the Node B over the HS-SICH because the lengths of original sequences of signaling bits for a single stream and dual streams differ.

(1) If the UE feeds back the HS-SICH according to the number of data streams over the downlink service channel transmitted from the Node B, then the Node B may detect the HS-SICH from the determined number of data streams to acquire the number of data streams and corresponding signaling information; and (2) If the Node B can not determine the number of data streams for which the UE feeds back the HS-SICH, then the Node B shall perform blind detection on the HS-SICH for both a single stream and dual streams to acquire the number of data streams and corresponding signaling information. The blind detection refers to that the Node B performs decoding in two respective HS-SICH encoding schemes of a single stream and dual streams, that is, performs decoding firstly with puncturing pattern for the rate matching in HS-SICH encoding of a single stream and then decoding with puncturing pattern for the rate matching in HS-SICH encoding of dual streams. Of course, decoding may be performed firstly with puncturing pattern for the rate matching in HS-SICH encoding of dual streams and then performed with puncturing pattern for the rate matching in HS-SICH encoding of a single stream. Since correct decoding can only be performed with a correct puncturing pattern, decoding is performed respectively for a single stream and dual streams without knowing the number of data streams targeted over the HS-SICH, and a correct decoding for one of a single stream and dual streams indicates that the one is targeted over the HS-SICH.

Preferably, a rate may preferentially be selected for use according to the number of data streams targeted over the HS-SICH received last time. For example, if a single stream is targeted over the HS-SICH received last time, then decoding is performed preferentially with puncturing pattern for the rate matching in HS-SICH encoding of a single stream to thereby improve the probability of successful decoding at a time and alleviate an effort of the Node B to perform blind detection.

In the foregoing embodiment, the total lengths of HS-SICH signaling for a single stream and dual streams of MIMO differ, and the Node B shall perform blind detection to acquire the number of data streams and corresponding signaling information. In order to lower the complexity of reception at the Node B, the total lengths of HS-SICH signaling for a single stream and dual streams may be set the same, and then it is sufficient for the Node B to perform detection once.

It shall be noted that the UE determines the signaling over the HS-SICH according to the number of received data streams over the downlink service channel in the foregoing operation 101. In a practical application, the UE may alternatively determine the signaling over the HS-SICH according to a channel condition, where if the user equipment recommends transmission in a single stream over the next downlink service channel, then signaling of the single stream is borne over the HS-SICH; or if the user equipment recommends transmission in dual streams over the next downlink service channel, then signaling of the dual streams is borne over the HS-SICH.

Figure 2:
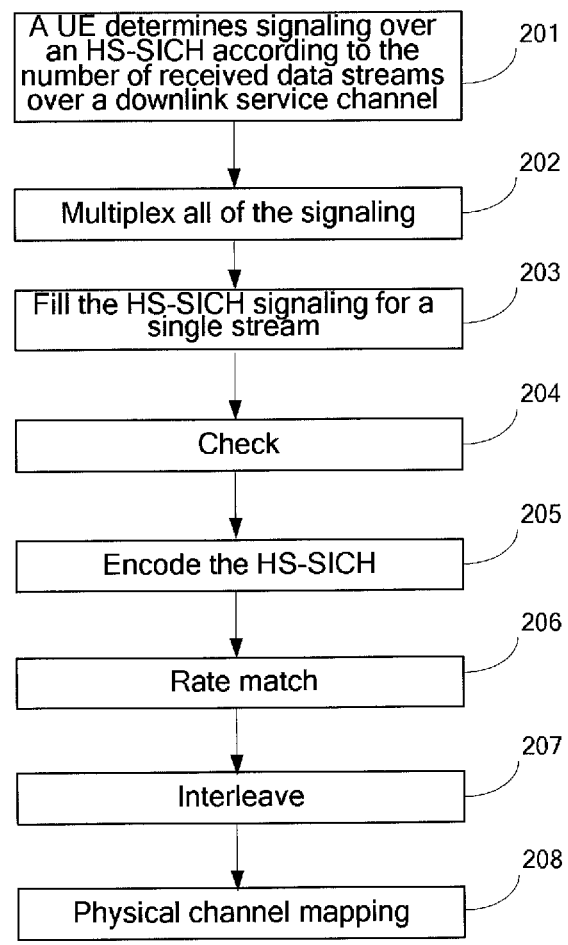
FIG. 2 illustrates a flow chart of a method for MIMO transmission in an HSPA+ system according to a second method embodiment of the invention.

Reference is made to FIG. 2 illustrating a flow chart of a method for MIMO transmission in an HSPA+ system according to a second method embodiment of the invention, which generally includes the following operations 201-208.

In the operation 201, a UE determines signaling over an HS-SICH according to the number of received data streams over a downlink service channel;

In the operation 202, all of the signaling, i.e., signaling of ACK, RMF, RTBS, etc., over the HS-SICH is multiplexed;

It shall be noted that the total length of signaling over the HS-SICH varies with a varying number of data streams because signaling information required for a single stream and dual streams is different in length;

In the operation 203, if the signaling of the dual streams exceeds that of the single stream by the part of padding bits, then the HS-SICH signaling of the single stream is filled with some bits so that the total length of filled signaling for the single stream is the same as that of the dual streams;

In the operation 204, a check is performed;

A check may be performed with a Cyclic Redundancy Code (CRC) to facilitate counting of block errors and to assist outer loop power control. Alternatively, a UE-specific CRC may be calculated (i.e., XORing the CRC check value and the identifier of the UE) and attached;

In the operation 205, the signaling over the HS-SICH is encoded, for example, with a convolution code;

In the operation 206, rate matching is performed;

If the length of a sequence resulting from the encoding of the channel is larger than the length of bits that can be borne over an allocated channelization code resource, then some bits of the sequence may be deleted appropriately; otherwise, no bit will be deleted;

In the operation 207, interleaving is performed; and

In the operation 208, physical channel mapping is performed to map the interleaved signaling over the HS-SICH onto the allocated channelization code resource, e.g., a channelization code with an SF of 8 or even with a lower SF.

In this present embodiment, signaling information over the HS-SICH are firstly multiplexed together and then encoded and borne over a channelization code resource which is richer than that in the existing standard, so that the acknowledgement of the UE for received data of dual streams can be fed back and the number of data streams in the next TTI and transport block sizes and modulation formats over the respective data streams can be recommended to a Node B over the HS-SICH.

Correspondingly, the Node B can obtain the signaling information over the HS-SICH by performing detection only once upon reception of the HS-SICH because the signaling over the HS-SICH for a single stream and dual streams is of the same length, that is, the same encoding rate and rate matching is adopted. There are the following two scenarios.

(1) If the UE feeds back the HS-SICH according to the number of data streams over the downlink service channel transmitted from the Node B, then the Node B may detect the HS-SICH once from the determined number of data streams; and (2) If the Node B can not determine the number of data streams for which the UE feeds back the HS-SICH, then the Node B shall perform detection once on the HS-SICH to acquire the number of data streams and corresponding signaling information. Specifically, the Node B may determine from the padding bits whether signaling information over the HS-SICH is for a single stream or dual streams, for example, the RIBS is of 6 bits for a single stream and 12 bits for dual streams, then the RIBS for a single stream may be filled with zeros of 6 bits and thus also be of a total length of 12 bits. After decoding the HS-SICH, the Node B firstly reads the 6 padding bits, and if all of them are zero, then it indicates that the HS-SICH is for a single stream; otherwise, it indicates that the HS-SICH is for dual streams. The Node B may read signaling information from significant bits after determining the number of data streams.

It shall be noted that the UE determines the signaling over the HS-SICH according to the number of received data streams over the downlink service channel in the foregoing operation 201. In a practical application, the UE may alternatively determine the signaling over the HS-SICH according to a channel condition, where if the user equipment recommends transmission in a single stream over the next downlink service channel, then signaling of the single stream is borne over the HS-SICH; or if the user equipment recommends transmission in dual streams over the next downlink service channel, then signaling of the dual streams is borne over the HS-SICH.

Figure 3:
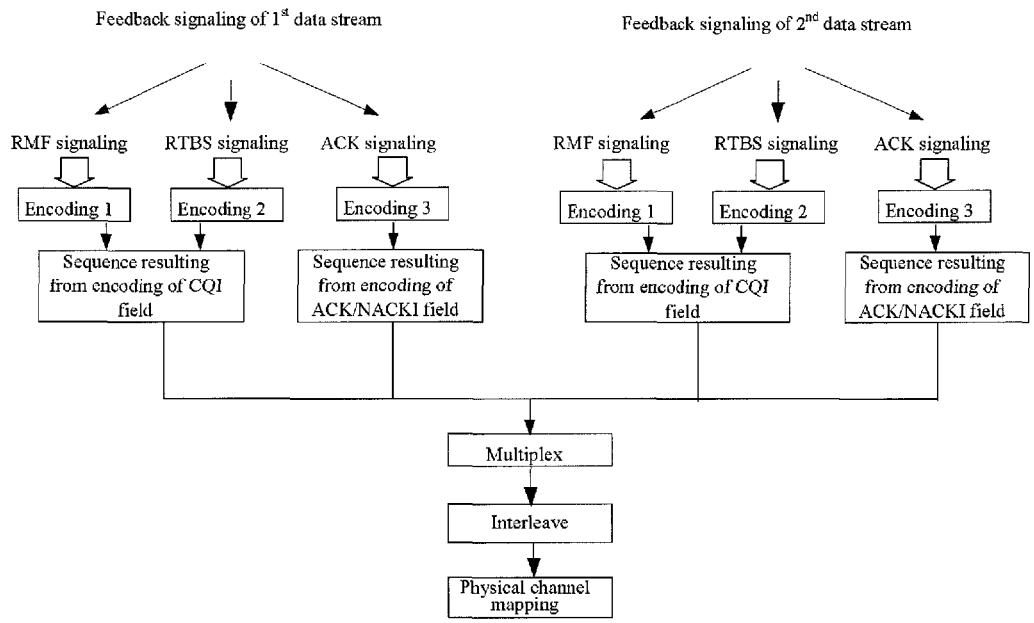
FIG. 3 illustrates a flow chart of a method for MIMO transmission in an HSPA+ system according to a third method embodiment of the invention.

Reference is made to FIG. 3 illustrating a flow chart of encoding and multiplexing over an HS-SICH in the method for MIMO transmission in an HSPA+ system according to a third method embodiment of the invention.

In this embodiment, a UE determines signaling over an HS-SICH according to the number of received data streams over a downlink service channel and determines a channelization code resource over which the HS-SICH is borne, in an MIMO mode.

If the UE is required to feed back the HS-SICH for the downlink service channel of a single stream, then it determines feedback signaling for the downlink service channel of the single stream and then encodes all of the signaling respectively as in the prior art and multiplexes and interleaves encoded signaling and next bears the multiplexed and interleaved signaling over a channelization code with an SF of 16 in physical channel mapping.

If the UE is required to feed back the HS-SICH for the downlink service channel of dual streams, then it determines feedback signaling for the downlink service channel of the dual streams and then encodes all of the signaling respectively. Since the feedback signaling of the dual streams is twice that of the single stream, a channelization code with an SF of 8 is selected for use to born the HS-SICH and equivalently twice the channelization code resource of the HS-SICH fed back for the downlink service channel of the single stream. Then the feedback signaling of ACK, RMF and RTBS for each of the dual streams is encoded in the same encoding scheme and at the same encoding rate as in the prior art and then multiplexed together and interleaved and next borne over a channelization code with an SF of 8 in physical channel mapping. The feedback signaling of the two streams may be arranged in an arbitrary but necessarily prescribed relationship so that the Node B may decode the HS-SICH in consistency with the signaling arrangement sequence used for the UE to thereby acquire the corresponding signaling information.

In FIG. 3, the feedback control signaling of the two data streams may be encoded respectively in the same encoding scheme as in the prior art. If the UE is required to feed back the HS-SICH for the downlink service channel of a single stream, then it is sufficient to select only one of the data streams in the FIG. 3, and then a channelization code with an SF of 16 is used for bearing the HS-SICH in physical channel mapping; or if the UE is required to feed back the HS-SICH for the downlink service channel of dual streams, then the feedback signaling of the two data streams in the FIG. 3 is encoded respectively and a channelization code with an SF of 8 is used for bearing the HS-SICH in physical channel mapping. Since a channelization code with an SF of 8 is equivalent to two virtual channelization codes with an SF of 16, the feedback signaling over each of the data streams may be mapped onto one of the virtual channelization codes with an SF of 16 so that the feedback signaling of the respective data streams will be the same as that over the HS-SICH for the downlink service channel of a single stream in the prior art. Furthermore, the feedback signaling of the two streams may be arranged in an arbitrary but necessarily prescribed relationship.

Correspondingly, the Node B can determine the number of data streams for which the UE feeds back the HS-SICH upon reception of the HS-SICH because the UE feeds back the HS-SICH according to the number of data streams over the downlink service channel transmitted form the Node B. The Node B receives and detects the HS-SICH over the corresponding channelization code resource according to the determined number of data streams.

If the HS-SICH is fed back is for the downlink service channel of a single stream, then the Node B receives and detects the HS-SICH over a corresponding channelization code with an SF of 16.

If the HS-SICH is fed back is for the downlink service channel of dual streams, then the Node B receives and detects the HS-SICH over a corresponding channelization code with an SF of 8 and acquires the respective signaling information according to the prescribed relationship in which the feedback signaling of the two streams is arranged.

In this embodiment, the channelization code resource over which the HS-SICH is borne is selected flexibly according to the number of data streams, and the signaling information over the HS-SICH is encoded respectively in a similar encoding scheme of the HS-SICH to that in the prior art and then multiplexed and mapped to a physical channel.

In this embodiment, the UE feeds back the HS-SICH according to the number of received data streams over the downlink service channel transmitted from the Node B, so that the Node B can know the number of data streams targeted over the HS-SICH to thereby simply and conveniently detect the HS-SICH and acquire the corresponding signaling information.

Figure 4:
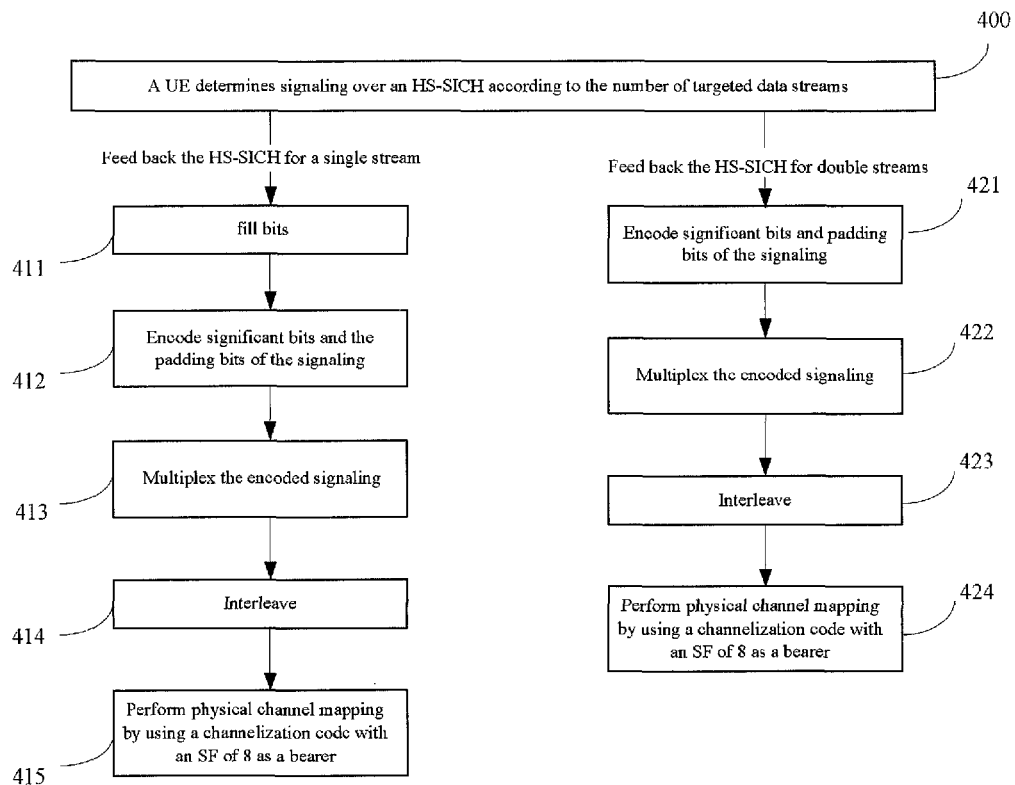
FIG. 4 illustrates a flow chart of a method for MIMO transmission in an HSPA+ system according to a fourth method embodiment of the invention.

Reference is made to FIG. 4 illustrating a flow chart of the method for MIMO transmission in an HSPA+ system according to a forth method embodiment of the invention, which generally includes the following operations 400, 411-415 and 421-424.

In the operation 400, a UE determines signaling over an HS-SICH according to the number of targeted data streams, which may be different from the number of data streams over a downlink service channel received by the UE, where if the UE is required to feed the HS-SICH for a single stream, then it determines signaling information over the single stream and then the operation 411 is executed; or if the UE is required to feed the HS-SICH for dual streams, then it determines signaling information over the dual streams and then the operation 412 is executed;

In the operation 411, if the signaling of the dual streams exceeds that of the single stream by the part of padding bits, then the HS-SICH signaling of the single stream is filled with some bits so that the total length of filled signaling of the single stream is the same as that of the dual streams;

In the operation 412, significant bits and the padding bits of the signaling may be encoded in the same encoding scheme as in the prior art;

During encoding, the significant bits and the padding bits of the signaling may be encoded respectively or together.

In the operation 413, the encoded signaling is multiplexed;

In the operation 414, interleaving is performed on the multiplexed signaling;

In the operation 415, physical channel mapping is performed by using a channelization code with an SF of 8 as a bearer;

In the operation 421, the signaling over the two data streams is encoded respectively, and since the feedback signaling of the dual streams is twice that of the single stream, a channelization code with an SF of 8 is selected for use to bear the HS-SICH and equivalently twice the channelization code resource of the HS-SICH for the single stream. Then the signaling of ACK, RMF and RIBS for each of the dual streams is encoded in the same encoding scheme and at the same encoding rate as in the prior art.

In the operation 422, the encoded signaling is multiplexed together;

In the operation 423, interleaving is performed on the multiplexed signaling; and In the operation 424, physical channel mapping is performed by using a channelization code with an SF of 8 as a bearer.

It shall be noted that in the foregoing two scenarios, the signaling can be arranged in an arbitrary but necessarily prescribed relationship for both the significant and padding bits over the HS-SICH of the single stream and the bits over the HS-SICH of the dual streams, so that the Node B can decode the HS-SICH in consistency with the signaling arrangement sequence used for the UE to thereby acquire the corresponding signaling.

Correspondingly, when the Node B receives the HS-SICH, the number of data streams determined by the UE may be different from the number of data streams over the downlink service channel received by the UE, and the Node B can not determine directly the number of data streams for which the UE feeds back the HS-SIGH, but the signaling of a single data stream and dual streams is of the same length, so that the Node B may receive the HS-SICH over a corresponding channelization code with an SF of 8 and detect the HS-SICH once to acquire the number of data streams and corresponding signaling information. Particularly, the Node B can determine from the padding bits whether the signaling information over the HS-SICH is for a single stream or dual streams, for example, the RTBS is of 6 bits for a single stream and 12 bits for dual streams, and then the RTBS for a single stream can be filled with zeros of 6 bits and thus also be of a total length of 12 bits. After decoding the HS-SICH, the Node B firstly reads the 6 padding bits, and if all of them are zero, then it indicates that the HS-SICH is for a single stream; otherwise, it indicates that the HS-SICH is for dual streams. The Node B can read the signaling information from significant bits after determining the number of data streams.

The operations of the method described in connection with the embodiments disclosed here may be performed directly in hardware, a software module executed by a processor or a combination of both. The software module may be built in a Random Access Memory (RAM), an internal memory, a Read Only Memory (ROM), an electrically programmable ROM, an electrically erasable and programmable ROM, a register, a hard disk, a removable disk, a CD-ROM or a storage medium in any other form well known in the art.

A user equipment for supporting downlink MIMO transmission in a TDD HSPA+ system is further provided in an embodiment of the invention.

Figure 5:
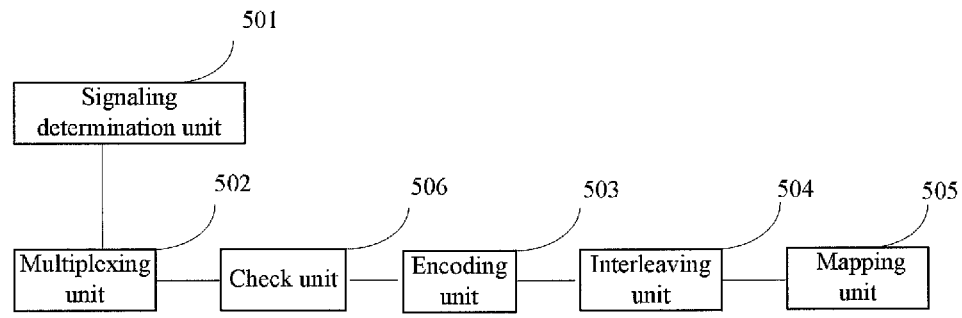
FIG. 5 illustrates a schematic diagram of the structure of a user equipment according to a first device embodiment of the invention.

Reference is made to FIG. 5 illustrating a schematic diagram of a structure of the user equipment according to a first device embodiment of the invention:

The user equipment includes a signaling determination unit 501, a multiplexing unit 502, an encoding unit 503, an interleaving unit 504 and a mapping unit 505, which are connected in sequence, and a check unit 506 may further be included between the multiplexing unit 502 and the encoding unit 503.

Particularly, the signaling determination unit 501 is configured to determine signaling over a High Speed Shared Information Channel (HS-SICH), possibly according to the number of received data streams over a downlink service channel or a channel condition, that is, the number of data streams corresponding to the HS-SICH fed back from the user equipment may be different from or the same as the number of data streams over the downlink service channel; the multiplexing unit 502 is configured to multiplex the signaling into HS-SICH signaling; the encoding unit 503 is configured to perform channel encoding on the HS-SICH signaling; the interleaving unit 504 is configured to output a read sequence resulting from the multiplexing and the encoding in a specific sequence according to a specified interleave pattern; the mapping unit 505 is configured to map the output of the interleaving unit onto an allocated channelization code resource; and the check unit 506 is configured to check the HS-SICH signaling output from the multiplexing unit, possibly in a CRC check, in a UE-specific CRC (i.e., calculating the UE-specific CRC by XORing a CRC value and the identifier of the user equipment, and attaching the calculated UE-specific CRC to the HS-SICH signaling) or in another check.

With the user equipment according to this embodiment of the invention, signaling information over the HS-SICH channel is firstly multiplexed together and then encoded and borne over a channelization code resource which is richer than that in the existing standard, e.g., a channelization code with an SF of 8 so that the acknowledgement of the UE for received data of dual streams can be fed back and the number of data streams in the next TTI and transport block sizes and modulation formats over the respective data streams can be recommended to a Node B, over the HS-SICH channel.

In this embodiment, the HS-SICH signaling resulting from multiplexing by the multiplexing unit 502 is of different lengths for a single stream and dual streams. Thus upon reception of the HS-SICH, the Node B may perform blind detection on the HS-SICH for both a single stream and dual streams to acquire the number of data streams and corresponding signaling information.

For a process of MIMO transmission with the user embodiment according to this embodiment of the invention, reference can be made to the foregoing description in the first method embodiment of the invention, and a repeated description thereof will be omitted here.

Figure 6:
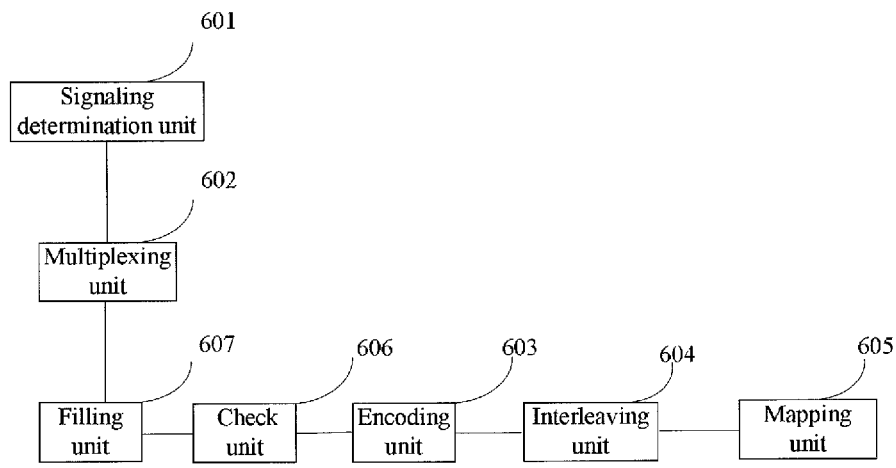
FIG. 6 illustrates a schematic diagram of the structure of a user equipment according to a second device embodiment of the invention.

Reference is made to FIG. 6 illustrating a schematic diagram of a structure of the user equipment according to a second device embodiment of the invention;

Unlike the embodiment illustrated in FIG. 5, in addition to a signaling determination unit 601, a multiplexing unit 602, an encoding unit 603, an interleaving unit 604, a mapping unit 605 and a check unit 606, which are the same as those corresponding units in FIG. 5, the user equipment in this embodiment further includes a filling unit 607, between the multiplexing unit 602 and the check unit 606, configured to fill bits into the HS-SIGH signaling resulting from the multiplexing for the single stream.

In this embodiment, the padding unit 607 may be used to make the HS-SICH signaling resulting from the multiplexing by the multiplexing unit 602 be of the same length for the single stream and the dual streams. Thus upon reception of the HS-SICH, the Node B may determine from the padding bits whether the signaling information over the HS-SICH is for a single stream or dual stream and read the signaling information from significant bits after determining the number of data streams.

For a process of MIMO transmission with the user embodiment according to this embodiment of the invention, reference can be made to the foregoing description in the second method embodiment of the invention, and a repeated description thereof will be omitted here.

Figure 7:
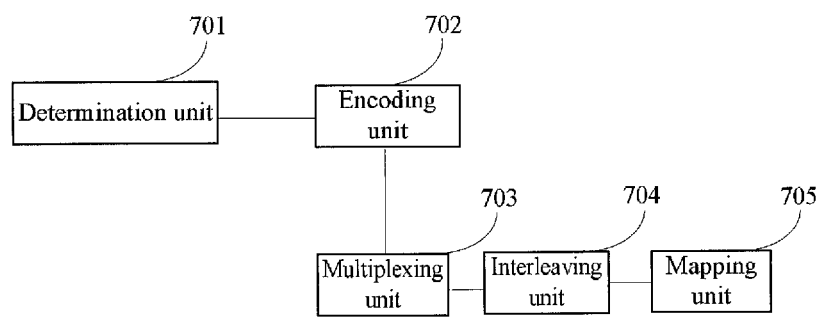
FIG. 7 illustrates a schematic diagram of the structure of a user equipment according to a third device embodiment of the invention.

Reference is made to FIG. 7 illustrating a schematic diagram of a structure of the user equipment according to a third device embodiment of the invention:

The user equipment includes a determination unit 701, an encoding unit 702, a multiplexing unit 703, an interleaving unit 704 and a mapping unit 705, which are connected in sequence.

Particularly, the determination unit 701 is configured to determine signaling over a High Speed Shared Information Channel (HS-SICH) and to determine a channelization code resource over which the HS-SICH is borne according to the number of data streams over a downlink service channel. The determination unit may determine the signaling over the HS-SICH according to the number of received data streams over the downlink service channel or a channel condition. The determination unit determines the channelization code resource over which the HS-SICH is borne by allocating a channelization code with a spread factor of 16 as the channelization code resource over which the HS-SICH is borne if the data stream over the downlink service channel is a single stream or allocating a channelization code with a spread factor of 8 as the channelization code resource over which the HS-SICH is borne if the data streams over the downlink service channel are dual streams.

The encoding unit 702 is configured to encode the signaling over the HS-SICH respectively.

The multiplexing unit 703 is configured to multiplex all of the encoded signaling.

The interleaving unit 704 is configured to output a read sequence resulting from the multiplexing and the encoding in a specific sequence according to a specified interleave pattern.

The mapping unit 705 is configured to map an output from the interleaving unit onto the determined channelization code resource over which the HS-SICH is borne.

With the user equipment according to this embodiment of the invention, the determination unit 701 may select flexibly the channelization code resource over which the HS-SICH is borne, and the signaling information over the HS-SICH channel may be encoded respectively in a similar encoding scheme of the HS-SICH to that in the prior art and then multiplexed and mapped to a physical channel so that the acknowledgement of the UE for received data of dual streams can be fed back and the number of data streams in the next TTI and transport block sizes and modulation formats over the respective data streams can be recommended to a Node B, over the HS-SICH channel.

In this embodiment, the HS-SICH signaling encoded by the encoding unit 702 is of different lengths for a single stream and dual streams, and since a CRC check is absent, the Node B can not acquire from blind detection the number of data streams targeted over the HS-SICH. Therefore in this embodiment, the number of data streams targeted over the HS-SICH shall be equal to the number of data streams over the downlink service channel received by the user equipment.

For a process of MIMO transmission with the user embodiment according to this embodiment of the invention, reference can be made to the foregoing description in the third method embodiment of the invention, and a repeated description thereof will be omitted here.

Figure 8:
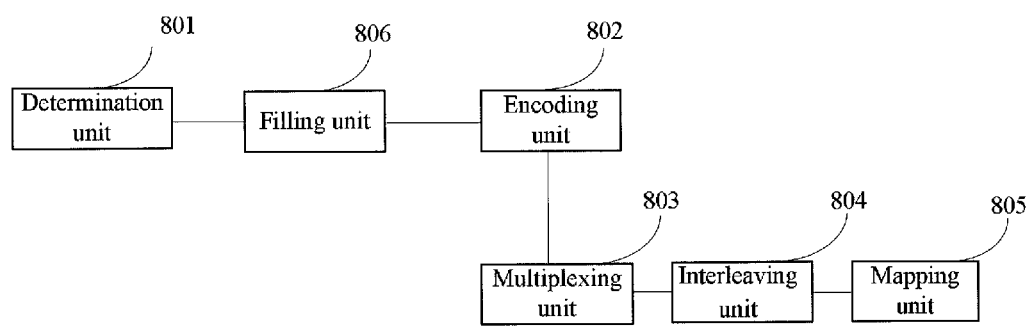
FIG. 8 illustrates a schematic diagram of the structure of a user equipment according to a fourth device embodiment of the invention.

Reference is made to FIG. 8 illustrating a schematic diagram of a structure of the user equipment according to a fourth device embodiment of the invention;

Unlike the embodiment illustrated in FIG. 7, in addition to a determination unit 801, an encoding unit 802, a multiplexing unit 803, an interleaving unit 804 and a mapping unit 805, which are the same as those corresponding units in FIG. 7, the user equipment in this embodiment further include a filling unit 806, between the determination unit 801 and the encoding unit 802, configured to fill bits into the HS-SICH signaling resulting from the multiplexing for a single stream.

In this embodiment, the filling unit 806 may be used to make the HS-SICH signaling input from the encoding unit 802 be of the same length for the single stream and the dual streams. Thus upon reception of the HS-SICH, the Node B may determine from the padding bits whether the signaling information over the HS-SICH is for a single stream or dual streams and read the signaling information from significant bits after determining the number of data streams.

For a process of MIMO transmission with the user embodiment according to this embodiment of the invention, reference can be made to the foregoing description in the fourth method embodiment of the invention, and a repeated description thereof will be omitted here.

The respective embodiments of the invention described above will not be constructed in any sense of limiting the scope of the invention, and any modifications, equivalents, adaptations, etc., made without departing from the principle of the invention shall be encompassed in the scope of the appended claims to the invention.

It shall be noted that the foregoing embodiments are merely intended to illustrate but not limit the technical solutions in the embodiments of the invention and although the embodiments of the invention have been described in details with reference to the preferred embodiments, those ordinarily skilled in the art shall appreciate that the technical solutions in the embodiments of the invention can be modified or equivalently altered without departing from the scope of the technical solutions in the embodiments of the invention.

The invention claimed is:

1. A method for Multiple Input Multiple Output, MIMO, transmission in a high speed packet access evolution system, comprising:

determining, by a user equipment, signaling over a High Speed Shared Information Channel, HS-SICH according to a number of received data streams over a downlink service channel, and determining a channelization code resource over which the HS-SICH is borne according to the number of data streams over the downlink service channel, wherein if the received data stream over the downlink service channel is a single data stream, signaling of the single data stream is borne over the HS-SICH and a channelization code resource with a spread factor of 16 is allocated as the channelization code resource over which the HS-SICH is borne, wherein if the received data streams over the downlink service channel are dual data streams, signaling of the dual data streams is borne over the HS-SICH and a channelization code resource with a spread factor of 8 is allocated as the channelization code resource over which the HS-SICH is borne;

encoding the signaling over the HS-SICH respectively; and multiplexing and mapping encoded signaling onto determined channelization code resource over which the HS-SICH is borne.

2. The method of claim 1, wherein the HS-SICH signaling is of different lengths for a single stream and dual streams.

3. The method of claim 1, wherein the HS-SICH signaling is of an identical length for a single stream and dual streams, and the method further comprises:

filling bits into the HS-SICH signaling for the single stream before encoding the signaling respectively.

4. The method of claim 3, wherein encoding the signaling over the HS-SICH respectively comprises:

encoding padding bits and significant bits in the HS-SICH signaling, comprising the padding bits and the significant bits, for the single stream.

5. The method of claim 4, further comprising:

determining from the padding bits at a network side the number of data streams targeted by signaling information over the HS-SICH;

determining the significant bits of the signaling information over the HS-SICH according to the number of data streams; and acquiring the signaling information from the significant bits.

6. A user equipment, comprising:

a determination unit configured to determine signaling over a High Speed Shared Information Channel, HS-SICH according to a number of received data streams over a downlink service channel, and to determine a channelization code resource over which the HS-SICH is borne according to the number of data streams over the downlink service channel, wherein if the received data stream over the downlink service channel is a single data stream, signaling of the single data stream is borne over the HS-SICH and a channelization code resource with a spread factor of 16 is allocated as the channelization code resource over which the HS-SICH is borne, wherein if the received data streams over the downlink service channel are dual data streams, signaling of the dual data streams is borne over the HS-SICH and a channelization code resource with a spread factor of 8 is allocated as the channelization code resource over which the HS-SICH is borne;

an encoding unit connected with the determination unit and configured to encode the signaling over the HS-SICH respectively;

a multiplexing unit connected with the encoding unit and configured to multiplex encoded signaling;

an interleaving unit connected with the multiplexing unit and configured to output a read sequence resulting from multiplexing and encoding in a specific sequence according to a specified interleave pattern; and a mapping unit connected with the interleaving unit and configured to map an output from the interleaving unit onto the determined channelization code resource over which the HS-SICH is borne.

7. The user equipment of claim 6, wherein the HS-SICH signaling is of an identical length for a single stream and dual streams, and the user equipment further comprises:

a filling unit connected respectively with the determination unit and the encoding unit and configured to fill bits into the HS-SICH signaling for the single stream.

* * * * *